US 10,952,455 B2

(12) United States Patent
Cocchi et al.

(10) Patent No.: US 10,952,455 B2
(45) Date of Patent: Mar. 23, 2021

(54) MACHINE FOR MAKING FOOD PRODUCTS IN LIQUID OR SEMI-LIQUID FORM

(71) Applicant: ALI GROUP S.r.l. - CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 156 days.

(21) Appl. No.: 15/875,818

(22) Filed: Jan. 19, 2018

(65) Prior Publication Data
US 2018/0220675 A1    Aug. 9, 2018

(30) Foreign Application Priority Data

Feb. 9, 2017    (IT) .............................. 1020170014385

(51) Int. Cl.
*A23G 9/22*    (2006.01)
*A23G 9/28*    (2006.01)
*A23G 9/12*    (2006.01)

(52) U.S. Cl.
CPC .............. *A23G 9/228* (2013.01); *A23G 9/12* (2013.01); *A23G 9/281* (2013.01)

(58) Field of Classification Search
CPC .......... A23G 9/12; A23G 9/228; A23G 9/281; A23G 9/04; A23G 9/045; A23G 9/22; A23G 9/28; H04L 12/2825; D06F 39/005
See application file for complete search history.

(56) References Cited

U.S. PATENT DOCUMENTS

2002/0029575 A1* 3/2002 Okamoto ............ H04L 12/2803
62/125
2011/0011887 A1* 1/2011 Zaniboni .................. A23G 9/28
222/23
(Continued)

FOREIGN PATENT DOCUMENTS

EP    1905730 A1    4/2008
EP    2783574 A1    10/2014
(Continued)

OTHER PUBLICATIONS

Italian Search Report dated Oct. 17, 2017 from counterpart Italian App No. 201700014385.

*Primary Examiner* — Frantz F Jules
*Assistant Examiner* — Martha Tadesse
(74) *Attorney, Agent, or Firm* — Shuttleworth & Ingersoll, PLC; Timothy Klima

(57) ABSTRACT

A machine for making food products in liquid or semi-liquid form, including:
  a container for containing a basic product;
  a container for processing the basic product flowing out of the containing container;
  a stirring element mounted inside the processing container;
  a thermal treatment system associated with the processing container;
  a unit for driving and controlling the variables correlated with the aforementioned devices and systems;
  a user interface provided with operator controls and connected to the drive and control unit.
The user interface is configured to allow a remote service request to be sent by activating an operator control.

4 Claims, 1 Drawing Sheet

(56) References Cited

U.S. PATENT DOCUMENTS

| | | | |
|---|---|---|---|
| 2012/0223094 A1* | 9/2012 | Rickard, Jr. ........... | A23G 9/045 |
| | | | 222/1 |
| 2012/0240780 A1 | 9/2012 | Delbreil et al. | |
| 2012/0312049 A1* | 12/2012 | Downs, III ............ | A23G 9/281 |
| | | | 62/340 |
| 2014/0067131 A1* | 3/2014 | Park ........................ | D06F 34/28 |
| | | | 700/275 |
| 2014/0295044 A1* | 10/2014 | Cocchi ..................... | A23G 9/22 |
| | | | 426/520 |

FOREIGN PATENT DOCUMENTS

| | | |
|---|---|---|
| KR | 100541426 B1 * | 1/2006 |
| WO | WO2006081727 A1 | 8/2006 |

* cited by examiner

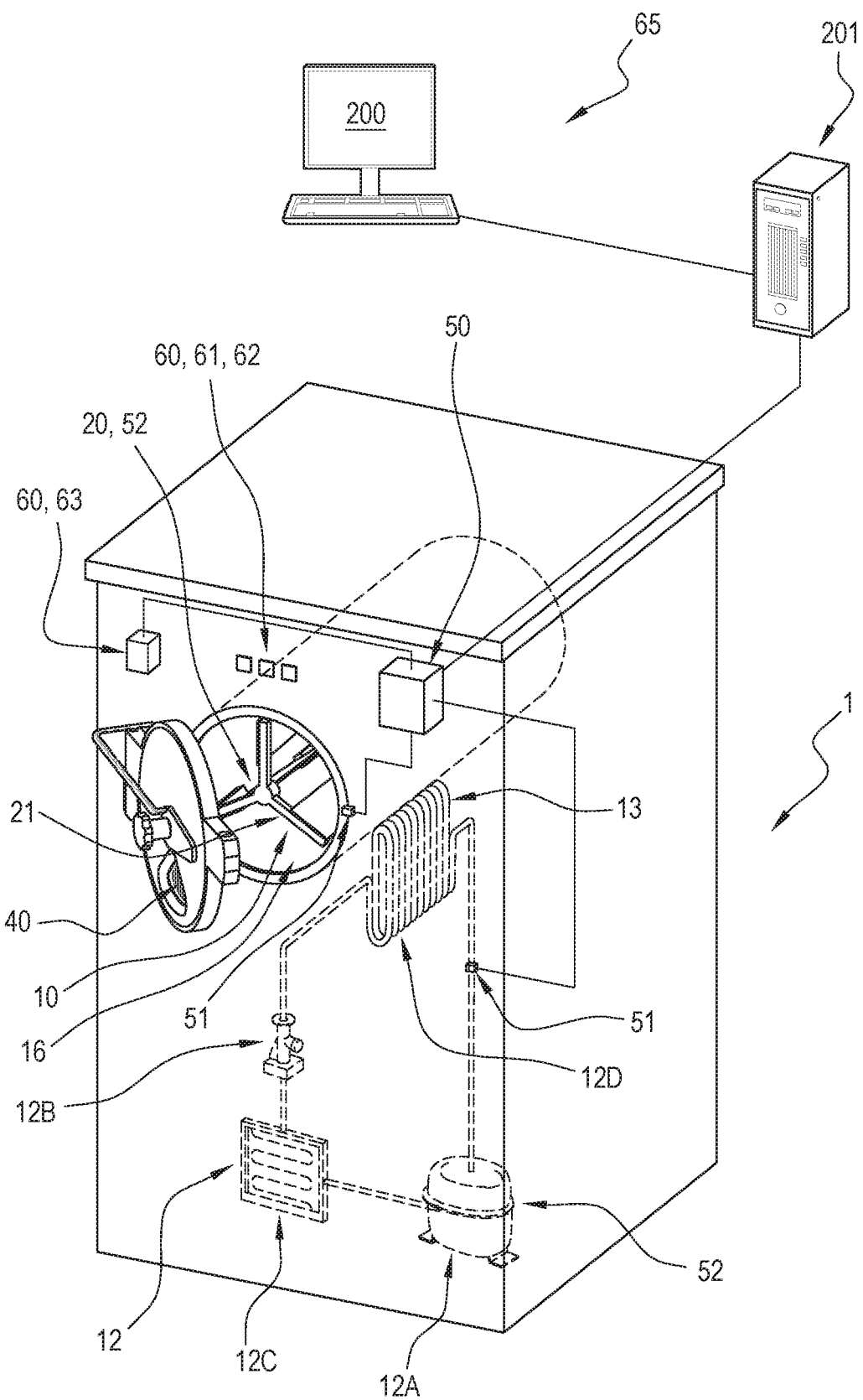

MACHINE FOR MAKING FOOD PRODUCTS IN LIQUID OR SEMI-LIQUID FORM

This application claims priority to Italian Patent Application No. 102017000014385 filed Feb. 9, 2017, the entirety of which is incorporated by reference herein.

BACKGROUND OF THE INVENTION

This invention relates to a machine for making food products in liquid or semi-liquid form.

This invention relates, more specifically, to a machine for making and dispensing food products such as granitas, ice creams, soft drinks and the like.

Machines of this kind consist basically of the following parts:
- a container in which the product (or set of basic products used to make the end product) is processed;
- a mixing device acting as a stirrer for the aforesaid products;
- a thermal treatment system associated with the above mentioned parts to keep the product at a preset temperature;
- a dispensing device for dispensing the product in the desired quantity.

In the specific case of machines for making and dispensing ice creams (without loss of generality), the thermal treatment system is what is commonly known as a batch freezer cylinder.

The batch freezer cylinder is a cylindrical chamber which is internally cooled (and which in turn cools the product mix it contains) by means of a cooling coil circuit mounted on the outside of the cylindrical chamber or in the space inside its wall: a refrigerant fluid flows inside the circuit.

Inside the batch freezer cylinder there is a stirring element, usually consisting of a set of blades extending along the surface of the cylinder and driven in continuous rotation by respective motor means.

The blades have a twofold function: firstly, to continuously stir the product, already in the desired form (of ice cream, for example) and secondly, to scrape the inside surface of the batch freezer cylinder in order to prevent the product from forming frozen blocks of ice when it comes into contact with the (colder) inside wall of the batch freezer cylinder.

Obviously, the different parts, circuits and actuators of the machine (we refer at least to the basic parts listed above) are equipped with measuring systems and the measurement data goes to a control unit configured to control the product production process according to predetermined programs.

It should be borne in mind that in machines of this kind, the balances which must coexist between the different circuits, actuators and product storage parts are extremely delicate and must remain within very precise limits if the product (ice cream in particular) is to keep perfectly in terms of consistency, degree of cooling, etc.

These values can vary and are directly correlated with the different types of product as a function of the properties of the ingredients used.

These functions are performed by the above mentioned control unit which runs different programs according to the product variables. The unit also checks that the different machine parts function correctly and, when necessary, issues alert messages indicating deviations from predetermined program values and, at worst, brings the machine to a stop in the event of malfunctioning of one or more parts or deviations of one or more basic values beyond preset threshold values.

In the event of a machine shutdown—or of an unacceptable malfunction alert—the operator can proceed in one of two ways: either taking direct action on the machine by troubleshooting in an attempt to find the correct solution or contacting an operator at a remote service point to inform the customer service of the situation.

At present, a customer service call depends on an ordinary telephone call made by the machine operator to the remote service point.

SUMMARY OF THE INVENTION

This invention has for an aim to provide a machine for making food products in liquid or semi-liquid form to overcome the above mentioned drawbacks of the prior art.

More specifically, the aim of this invention is to provide a machine for making food products in liquid or semi-liquid form and capable of allowing an operator to send an immediate service request signal to a remote service point.

A further aim of this invention is to provide a machine for making food products in liquid or semi-liquid form and capable of allowing the signal to be sent promptly together with information (characteristic values) describing the machine's current situation.

These aims are fully achieved by the machine and method of this invention, as characterized in the appended claims.

BRIEF DESCRIPTION OF THE DRAWINGS

These and other features of the invention will become more apparent from the following detailed description of a preferred, non-limiting embodiment of it, illustrated by way of example in the accompanying drawing, in which:

FIG. 1 illustrates a machine of the invention in a simplified view of its basic components.

DESCRIPTION OF THE PREFERRED EMBODIMENTS

With reference in particular to FIG. 1, the numeral 1 denotes a machine according to this invention.

The machine for making food products in liquid or semi-liquid form comprises:
- a container 10 for processing a basic product;
- a stirring element 20 mounted inside the processing container 10;
- a thermal treatment system 12 associated with the processing container 10 to thermally treat the basic product inside the processing container 10;
- a control and drive unit 50 for the thermal treatment system 12 and the stirring element 20;
- a user interface 60 provided with operator controls and connected to the drive and control unit 50.

Preferably, the processing container 10 is a batch freezer cylinder or an open-top tank.

It should be noted that the thermal treatment system 12 is preferably a thermodynamic system: the system preferably comprises a circuit with a heat exchanger fluid flowing through it.

The thermal treatment system 12 preferably also comprises a compressor 12A.

The thermal treatment system 12 also comprises at least a first and a second heat exchanger (12C, 12D).

The thermal treatment system 12 preferably further comprises a throttling device 12B, that is, a device for reducing fluid pressure.

According to the invention, the user interface 60 is configured to allow a remote service request to be sent by activating an operator control 61.

For example, the basic product may be dairy fresh cream, milk or an ice cream or yogurt mix.

Generally speaking, the basic product may be any liquid product used to make a liquid or semi-liquid finished food product, preferably of the ice cream or yogurt type.

The finished product made by the machine may be artisan gelato, soft ice cream, sorbet, granita, yogurt, a product of the ice cream and creamery trade, chocolate, etc.

According to another aspect, the operator controls are pushbuttons and the user interface 60 is configured to allow a remote service request to be sent by pressing one of the pushbuttons.

Also defined according to the invention is a system for making food products in liquid or semi-liquid form, comprising:
 a machine 1 of the type described in the foregoing;
 a remote processor 201 connected to an internet network and configured to receive a remote service request from the machine 1 when the aforementioned control 61 is activated.

According to one aspect, the machine is configured to establish a data transmission link to the remote server when the aforementioned control 61 is activated, for transmitting information relating to state parameters and/or operating parameters and/or configurations of the machine itself.

According to yet another aspect, the user interface 60 is configured to start transmitting information in real time (between the machine and the remote processor 201) when a control 61 is activated.

According to yet another aspect, the thermal treatment system 12 comprises a circuit, containing a heat exchanger fluid, and a compressor, and the information transmitted comprises the values of pressure at at least two points in the circuit.

According to another aspect, the machine comprises at least one temperature sensor associated with the circuit of the thermal treatment system 12 and the information transmitted comprises the value of a temperature detected by the temperature sensor associated with the circuit of the thermal treatment system 12.

According to yet another aspect, the machine 1 comprises at least one temperature sensor associated with the container 10 and the information transmitted comprises the value of a temperature detected by the temperature sensor associated with the container 10.

According to yet another aspect, the machine comprises an electric motor connected to the stirrer 20 and a sensor adapted to detect an electrical and/or magnetic parameter correlated with the mechanical torque applied by the electric motor to the stirrer 20, and the information transmitted comprises the value of a temperature detected by the sensor adapted to detect an electrical and/or magnetic parameter.

According to yet another aspect, the machine 1 comprises at least one temperature sensor adapted to detect an ambient temperature and the information transmitted comprises the value of a temperature detected by the temperature sensor adapted to detect an ambient temperature.

According to yet another aspect, the machine 1 comprises a plurality of actuators as well as sensors and/or electronic devices adapted to detect the state of the actuators, and the information transmitted comprises a detected state of the actuators.

According to yet another aspect, the machine 1 comprises at least one memory in which operating parameters and settings are stored, and wherein the information transmitted comprises the operating parameters and settings stored in the memory.

According to another aspect, the system comprising at least one processor 200 (which can be a personal computer) available to a maintenance operator and the remote server is configured to send a text or voice message to the at least one processor 200 available to the maintenance operator after receiving the remote service command.

To obtain the finished product from the basic product, the machine 1 comprises a processing container, labelled 10, in which the product is processed in order to convert it into a finished product ready for consumption.

When the product to be made is artisan gelato, the processing container 10 is preferably a hollow cylinder designated by the term "batch freezer cylinder".

The cylinder is subject to the action of a thermal treatment system, or cooling means, which are generically labelled 12 and which, in FIG. 1, are shown as a coil 13 in which the refrigerant fluid is made to flow.

The coil 13 may be wound round the outside of the batch freezer cylinder (made of metal) or it may be mounted directly in the space inside the wall of the batch freezer cylinder itself, depending on constructional requirements.

The function of the cooling means is to keep the finished product at a preset operating temperature.

Mounted inside the batch freezer cylinder is a stirring element 20, in the form of a set of blades 21 extending for the length of the batch freezer cylinder itself and movable in rotation in proximity to the inside wall 14 of the cylinder.

The function of the stirring element 20 is to mix the product inside the cylinder 10 not only during its conversion from basic product to finished product but also to keep the finished product at the right temperature and maintain its creamy consistency and other properties until served to the consumer.

The stirring element 20 is driven in rotation by a motor mounted outside the batch freezer cylinder 10 and connected to the stirring element along the centre line (not illustrated) of the stirring element and of the batch freezer cylinder.

Downstream of the batch freezer cylinder 10, that is, connected to its outfeed end 16, there are dispensing means 40 for dispensing the consumable, finished product and which, in practice, consist of nozzles or taps.

The dispensing means allow controlled dispensing of the finished product by the operator.

The dispensing means 40 may be adjusted manually or by specific control means acting in conjunction with a sensor capable of calculating the dispensable quantity of finished product so as to be able to define the moment the dispensing means must be turned off.

The numeral 50 denotes the aforementioned control and drive unit, which is equipped with sensing elements 51 and actuating elements 52 capable of detecting/acting on the different variables correlated with the devices or components making up the machine of the invention, described in the foregoing and illustrated.

For example, the elements 51 and 52 can control the following:
 the batch freezer cylinder 10, specifically its filling level, internal temperature, power absorption/torque of the motor which drives the rotation of the stirrer 20, etc.;

the operation of the dispensing means 40, specifically length of time they remain open, seal, etc.

It is specified that the above is only an example of the elements making up the machine and of what the control and drive unit is capable of detecting. That means the machine and the solution of this disclosure may, by analogy, include other parts not illustrated or described herein.

The numeral 60 denotes the aforementioned user interface, which is provided with operator controls and which is connected to the drive and control unit 50.

The user interface 60 preferably comprises a display unit 63.

In a preferred embodiment, the user interface 60 is configured to allow a remote service request to be sent by activating an operator control 61.

The control 61 consists of a pushbutton 62 mounted on the machine and designed to be pressed by the operator.

In a first, simplified embodiment, the pushbutton 62, when pressed, sends a service request directly to a remote service point, labelled 65.

In this case, the input given tells the remote service point that the operator has issued a request for remote service.

According to another aspect, the pushbutton 62 might provide access to a submenu (which appears on the display unit) to allow selecting one of the following alternative options:

A) sending a remote service request (without transmitting data);

B) or establishing a data transmission link to transmit information in real time to allow remote troubleshooting.

It should be noted that the machine might alternatively comprise a first pushbutton configured to allow sending a remote service request and a second pushbutton configured to allow establishing a data transmission link to transmit information in real time to allow remote troubleshooting.

According to this aspect, the first pushbutton issues a plain command, or request for assistance from a remote service point, whilst the second pushbutton may be of an active type, that is, one which sends directly to the remote service point a set of information from the aforementioned control unit and representing the values measured.

That way, the remote service point is immediately provided with a picture of how the machine is functioning (or malfunctioning) and can, also remotely, operate on the aforementioned actuating elements 52, where possible.

The solution disclosed herein achieves the set aims since it allows the operator, by simply pressing a pushbutton on the user interface (to make a plain call or to send process values measured), activate the remote service point to take action to remedy a possible malfunction.

Reference is made, for example, to a structure where a plurality of machines operate: in such a case, the faults detected and the request for assistance, control and feedback, if necessary, are transferred immediately to the remote service point, enabling the latter to take prompt action to efficiently deal with the situation.

Also defined according to this disclosure is a method for making a liquid or semi-liquid product and comprising the steps of providing a system as described in the foregoing and transmitting information in real time from the machine 1 to the at least one processor 200 (which can be a personal computer), to enable a remote operator to make a diagnosis.

The advantages of the invention are evident from the foregoing description: the machine 1 allows the operator at the point of sale to solve any problem promptly and efficiently.

It should be noted that the numeral 200 in FIG. 1 denotes the at least one processor (which can be a personal computer) of an operator and the numeral 201 a remote processor capable of receiving a service request.

According to another aspect, the remote processor 201 may be configured to send or transmit information to other processors 201 (used by specialist service technicians).

What is claimed is:

1. A system for making food products in liquid or semi-liquid form, comprising:
    a machine for making food products in liquid or semi-liquid form, comprising:
        a processing container for processing a basic product;
        a stirrer including at least one blade mounted inside the processing container;
        a thermal treatment system including a circuit including a heat exchanging fluid and a heat exchanger connected to the circuit, the thermal treatment system associated with the processing container to thermally treat the basic product inside the processing container;
        a control and drive unit including a sensor and an actuator for controlling and driving the thermal treatment system and the stirrer;
        a user interface including operator controls and connected to the control and drive unit, wherein the operator controls include at least one chosen from a pushbutton and an interactive display;
        wherein the user interface is capable of allowing transmitting of a remote service request by a machine user by activating at least one of the operator controls;
        at least one memory in which operating parameters and settings are stored,
        wherein transmitting of the remote service request includes transmitting information including at least some of the operating parameters and settings; and
    a remote processor connected to an internet network and configured to:
        1) receive the remote service request and the at least some of the operating parameters and settings from the machine when the at least one of the operator controls is activated; and
        2) establish a real time voice communication between the machine user and a remote maintenance operator;
    a personal computer available to the remote maintenance operator;
    wherein the remote processor is configured to send a text or voice message in real time to the personal computer after receiving the remote service request;
    wherein the operator controls include pushbuttons and the user interface is capable of allowing the remote service request to be sent by pressing at least one of the pushbuttons;
    the pushbuttons comprising a first pushbutton configured to allow sending the remote service request and a second pushbutton configured to allow establishing the data transmission link to transmit information in real time;
    wherein the machine comprises a first temperature sensor associated with the circuit of the thermal treatment s stem and wherein the transmitted information first sensor;
    wherein the machine comprises a second temperature sensor associated with the processing container and wherein the transmitted information comprises a value of a sensor;

wherein the machine comprises a third temperature sensor adapted to detect an ambient temperature and wherein the transmitted information comprises a value of the ambient temperature.

2. The system according to claim 1, wherein the thermal treatment system comprises a compressor, and wherein the transmitted information comprises values of pressure at at least two points in the circuit.

3. The system according to claim 1, wherein the machine comprises an electric motor connected to the stirrer and a sensor adapted to detect a torque applied by the electric motor to the stirrer, and wherein the transmitted information comprises a value of the torque.

4. The system according to claim 1, wherein the machine comprises a plurality of actuators and further comprises a plurality of sensors adapted to detect a state of at least one of the plurality of actuators, and wherein the transmitted information comprises the detected state of the at least one of the plurality of actuators.

* * * * *